(12) United States Patent
Stilwell et al.

(10) Patent No.: US 10,283,881 B2
(45) Date of Patent: May 7, 2019

(54) ELECTRICAL CONNECTION DEVICES WITH WELDED WIRE LEADS

(71) Applicant: Hubbell Incorporated, Shelton, CT (US)

(72) Inventors: Charles Mitchell Stilwell, Skiatook, OK (US); Mamoon Tawfiq Abedraboh, Tulsa, OK (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/648,502

(22) Filed: Jul. 13, 2017

(65) Prior Publication Data

US 2018/0019526 A1    Jan. 18, 2018

Related U.S. Application Data (60) Provisional application No. 62/361,646, filed on Jul. 13, 2016.

(51) Int. Cl.
*H01R 4/66* (2006.01)
*H02G 13/00* (2006.01)

(52) U.S. Cl.
CPC ............. *H01R 4/66* (2013.01); *H02G 13/40* (2013.01)

(58) Field of Classification Search
CPC .................................. H01R 4/66; H02G 13/40
USPC ..................................................... 439/100, 92
See application file for complete search history.

(56) References Cited

U.S. PATENT DOCUMENTS

| | | | | |
|---|---|---|---|---|
| 1,177,180 A | * | 3/1916 | Garton | H01R 4/66 174/7 |
| 2,060,151 A | * | 11/1936 | Wayman | H01R 4/66 174/7 |
| 2,068,545 A | | 1/1937 | Haig | |
| 2,157,180 A | * | 5/1939 | Little | H01R 4/66 174/6 |
| 2,449,313 A | * | 9/1948 | Naef | H01R 4/66 174/6 |
| 2,958,843 A | | 11/1960 | Long | |
| 3,020,608 A | | 2/1962 | Gelfand | |
| 3,378,967 A | * | 4/1968 | Baumeister | G01C 15/04 52/103 |
| 3,495,123 A | * | 2/1970 | Raddatz | H01R 4/66 313/354 |
| 4,087,945 A | * | 5/1978 | Berntsen | G01C 15/04 52/103 |
| 4,156,793 A | * | 5/1979 | Carlson | H01R 4/66 174/7 |
| 4,252,472 A | * | 2/1981 | Moraly | E04H 17/263 173/126 |

(Continued)

OTHER PUBLICATIONS

International Search Report and Written Opinion mailed in corresponding International Application PCT/US17/41816 dated Sep. 13, 2017 (9 pages).

(Continued)

*Primary Examiner* — Abdullah A Riyami
*Assistant Examiner* — Vladimir Imas
(74) *Attorney, Agent, or Firm* — Wissing Miller LLP (57) ABSTRACT

A grounding system includes an electrical connection device and a ground rod is provided. The electrical connection device includes a ground rod driver, such as a coupler, capable of being connected to the ground rod, and a conductor cable that is welded to the ground rod driver.

20 Claims, 10 Drawing Sheets

(56) References Cited

U.S. PATENT DOCUMENTS

| | | | | |
|---|---|---|---|---|
| 4,502,258 A * | 3/1985 | Rushing | ............... | G01C 15/04 52/103 |
| 4,688,969 A * | 8/1987 | Bruser | ............... | H01R 4/66 174/7 |
| 4,861,940 A * | 8/1989 | Carpenter, Jr. | ............... | H01R 4/66 174/6 |
| 5,148,641 A * | 9/1992 | Rushing | ............... | G01C 15/04 52/103 |
| 5,503,575 A * | 4/1996 | Ciampini | ............... | H01R 4/5016 439/783 |
| 6,963,026 B2 * | 11/2005 | Brennan | ............... | H01R 4/66 174/3 |
| 6,979,207 B2 * | 12/2005 | Wenger | ............... | H01R 4/5041 174/7 |
| 7,282,637 B2 * | 10/2007 | Stockin | ............... | H01R 4/66 174/6 |
| 7,462,776 B1 * | 12/2008 | Carpenter | ............... | H01R 3/08 174/40 CC |
| 7,732,707 B2 * | 6/2010 | Kim | ............... | H01R 13/5216 174/6 |
| 7,832,088 B2 * | 11/2010 | Stockin | ............... | H01R 4/66 174/6 |
| RE42,331 E * | 5/2011 | Carpenter, Jr. | ............... | H01R 3/08 174/40 CC |
| 8,299,362 B2 * | 10/2012 | Vaughan | ............... | H02G 3/0683 174/50 |
| 8,562,361 B2 * | 10/2013 | Corbett | ............... | H01R 4/26 439/100 |
| 9,051,705 B1 | 6/2015 | Rose | | |
| 9,472,868 B2 * | 10/2016 | Siebens | ............... | H01R 4/646 |
| 2006/0126259 A1 | 6/2006 | Stockin et al. | | |
| 2009/0004895 A1 | 1/2009 | Duley | | |

OTHER PUBLICATIONS

Eritech (R) Brochure, "Hammerlock", ERICO International Corporation, 2009 (2 pages).

* cited by examiner

ELECTRICAL CONNECTION DEVICES WITH WELDED WIRE LEADS

CROSS REFERENCE TO RELATED APPLICATIONS

The present application is based on and claims benefit from U.S. Provisional Application Ser. No. 62/361,646 filed Jul. 13, 2016 entitled "Electrical Connection Devices with Welded Wire Leads" the entire contents of which are herein incorporated by reference.

BACKGROUND

Field

The present disclosure relates to electrical connection devices and, more particularly, to electrical connection devices with welded wire leads.

Description of the Related Art

An earth ground may include one or more grounding rods which are driven into the earth. One or more cables are attached to the grounding rods, generally by use of a clamp, a crimping connector or a weld such as an exothermic reaction weld. Clamps and crimping connectors are subject to possible loosening over time and may be prone to corrosion occurring between the clamp or crimping connector and the ground rod. Such corrosion causes increased electrical resistance and may ultimately cause the ground connection to deteriorate to a point creating a hazardous situation. Exothermic reaction welding is often used for providing a permanent joint between metal parts including ground rods and wire cables. However, exothermic reaction welding requires the use of specialized pieces of equipment and requires a certain degree of skill and care.

Exothermic reaction welding utilizes a reusable exothermic reaction mold. The mold includes an internal crucible and a mold portion below the crucible for holding the parts to be joined. For example, after the ground rod (or multiple ground rods attached together end to end) are driven vertically into the ground, the mold portion is placed over the accessible portion of the ground rod. A proximate end of an extension cable is then inserted into the mold portion generally perpendicular to and abutting the ground rod. A disc of material (generally steel) is placed in a bottom portion of the crucible and an exothermic powder (e.g., an exothermic weld powder) is poured into the crucible on top of the disc of material. The mold generally includes a removable cover (which is generally hinged to the lower portion of mold) having a hole extending there through from the top of the cover to the crucible.

Various methods exist for igniting the exothermic powder. One method of igniting the exothermic powder involves pouring an ignition powder into the hole in the cover of the mold. The ignition powder is then ignited using a spark or ignition source such as a flint gun, also called a "flint ignitor". The ignition powder ignites the exothermic powder starting the exothermic reaction. Another method of igniting the exothermic powder utilizes a remote ignition system in place of the flint ignitor.

When the exothermic powder ignites, an exothermic reaction is created in the crucible. The exothermic reaction liquefies the exothermic powder and the disc of material which then flow down from the crucible into the mold portion holding the parts to be joined. When the mold has cooled sufficiently, the mold is removed, leaving the parts (e.g., ground rod and cable) welded together with a solid molecular bond.

Exothermic reaction welding is a preferable welding method between different metals as it forms permanent molecular bonds which are not subject to deterioration, corrosion, does not require periodic maintenance and provides a very low electrical resistance joint.

However, during the exothermic reaction, sparks, flames and hot gasses may be discharged from the mold. Accordingly, exothermic reaction welding requires a certain degree of skill and care by the person making the weld. Furthermore, exothermic reaction welding may not be utilized in certain environments. For example, exothermic welding is not a recommended method for welding electrical conductors at jobsites and areas classified as hazardous. These hazardous areas may include sites utilizing certain gasses, chemicals, $CO_2$ plants, etc. The sparks, excessive heat and smoke generated by the exothermic reaction can lead to unpredictable fires and/or other hazardous conditions.

Accordingly, a need exists for a system of providing ground cable to ground rod connections that does not use a clamp or crimp connector and which does not require the end user to perform an exothermic reaction weld at the jobsite.

SUMMARY

The present disclosure provides electrical connection devices that include a ground rod driver capable of being connected to a ground rod and a conductor cable welded to the ground rod driver. The present disclosure also provides a grounding kit that includes an electrical connection device and a ground rod. The electrical connection device includes a ground rod driver capable of being connected to the ground rod, and a conductor cable welded to the ground rod driver. In an exemplary embodiment, the conductor cable may be welded to the ground rod driver utilizing an exothermic welding process.

In one exemplary embodiment, the ground rod driver may be a female coupler that attaches to the ground rod. The female coupler may, for example, include a threaded receptacle that is attached to a threaded portion of the ground rod. As another example, the female coupler may include a tapered receptacle for a press-fit attachment to the ground rod. In another exemplary embodiment, the ground rod driver may be a male coupler that attaches to the ground rod. The male coupler may, for example, include a threaded coupler that is attached to a threaded portion of the ground rod. As another example, the male coupler may include an end configured for a press-fit attachment to the ground rod. The ground rod driver may be made of, for example, copper, brass or stainless steel.

In one exemplary embodiment, the conductor cable may be made of copper, aluminum, steel, stainless steel or brass. The conductor cable may be a stranded cable or a solid cable, and may have a connector, such as a terminal lug, connected to a free end of the cable.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Illustrative embodiments of the electrical connection devices according to the present disclosure may be provided as improvements to grounding systems. For example, a grounding system or kit may include an electrical connection device according to the present disclosure and a ground rod. The electrical connection device includes a cable extension attached to a ground rod driver, and the ground rod driver that is capable of being attached to the ground rod of the grounding system. The ground rod driver is provided to assist in driving the ground rod into the ground, and to provide a conductive path between the cable extension and the ground rod. According to illustrative embodiments of the present disclosure, the ground rod driver may come in a number of forms, such as a coupler, such as a joining coupler used for joining sections of ground rod, a connector, or a plug.

Illustrative embodiments of the electrical connection device of the present disclosure provide cable extensions attached to ground rod drivers for coupling the cable extensions to a ground rod. The cable extensions may be of various sizes and lengths and may have a connector, such as a terminal lug, attached to the free or distal end suitable for a particular application, providing end users with different options for the grounding system. The connector may be attached to the distal end of the cable extension by at least one of crimping, clamping and exothermic reaction welding.

The ground rod driver may include a threaded portion for attaching to the ground rod or may include a press-fit portion for press-fitting (or friction fit) attachment to the ground rod. According to an illustrative embodiment, exothermic reaction welding is used to join the cable extension to the ground rod driver. The cable extension may be attached to the ground rod driver at a remote location including, for example, a factory and then shipped ready-to-use to a customer or jobsite avoiding the need to attach the cable extension to the ground rod at the jobsite.

The cable extensions as described herein may be stranded or solid wire cables and may be of various sizes suitable for particular applications. The cable extensions and ground rod drivers may be copper, aluminum, steel, stainless steel, brass, etc. or other material suitable for providing an appropriate electrical connection. The ground rods described herein may be copper, aluminum, stainless steel, brass, etc., or other material suitable for providing an electrical path to earth ground.

Figure 1:
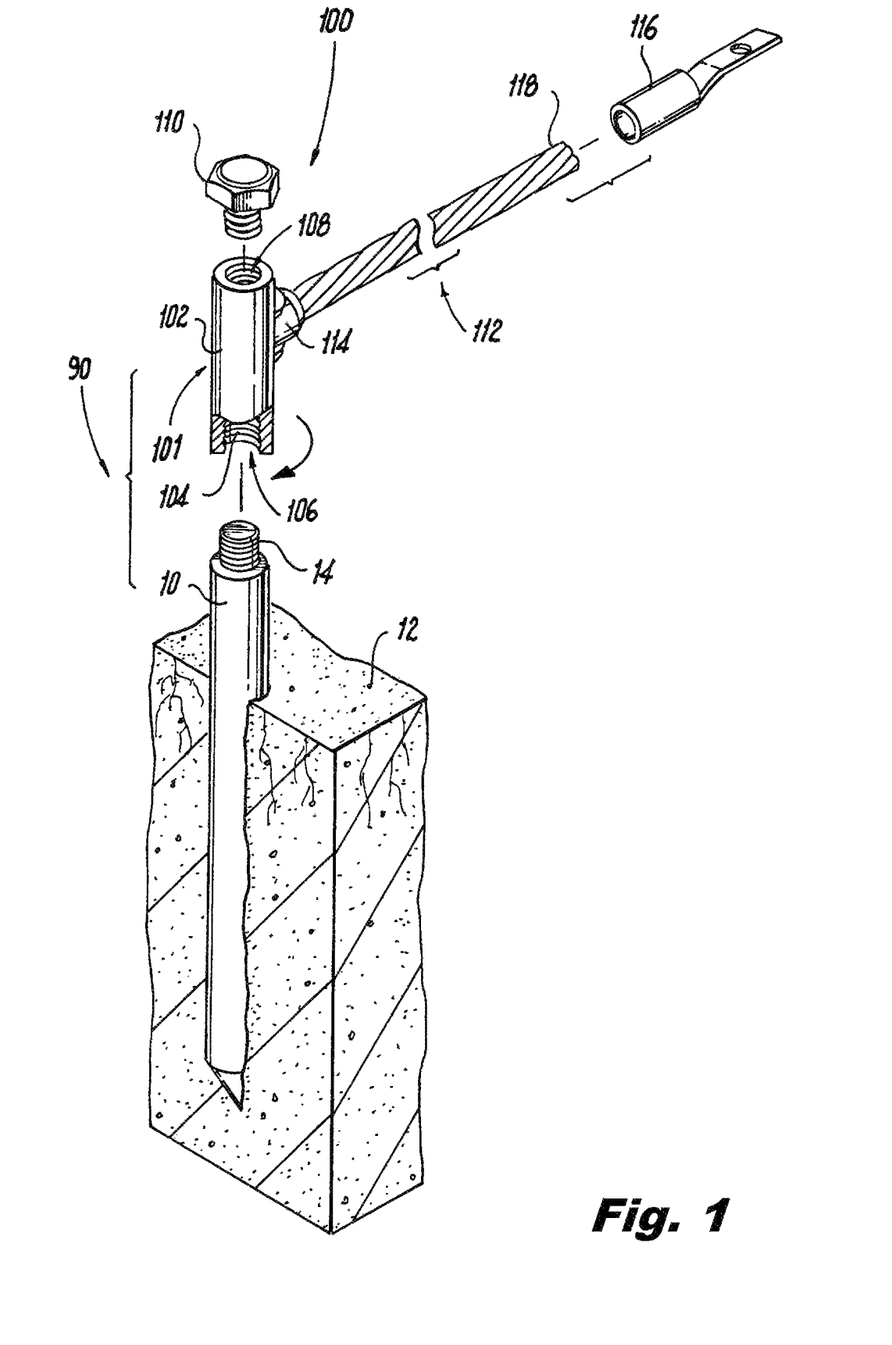
FIG. 1 depicts a perspective view of a grounding system according to an illustrative embodiment of the present disclosure, illustrating a threaded type electrical connection device and a ground rod.
Figure 2:
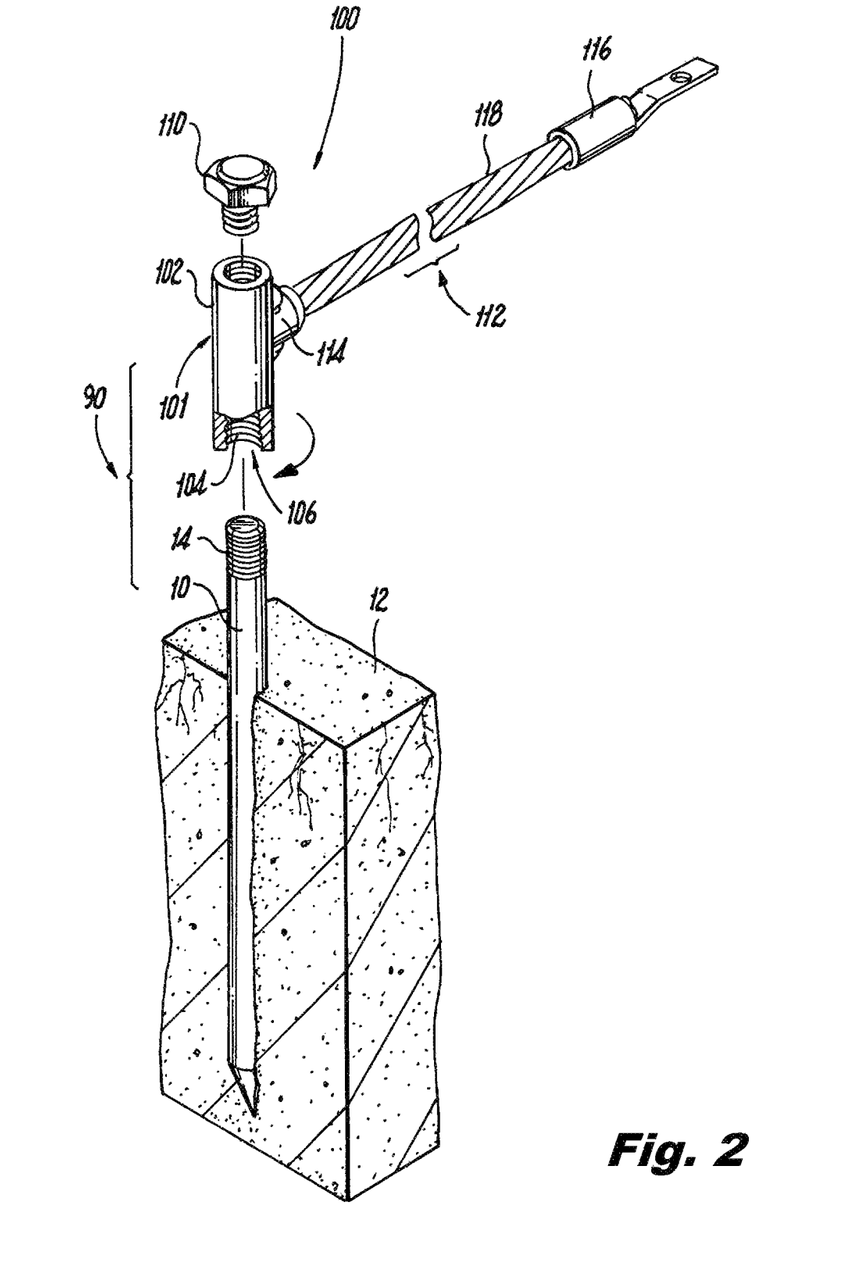
FIG. 2 depicts a perspective view of a grounding system according to another illustrative embodiment of the present disclosure, illustrating a threaded type electrical connection device and a ground rod.

A grounding system (or kit) according to an illustrative embodiment of the present disclosure is shown in FIGS. 1 and 2. The grounding system 90 includes at least one grounding rod 10 and at least one electrical connection device 100. The electrical connection device includes a ground rod driver 101 and a cable extension 112. As noted, the ground rod driver 101 may come in a number of forms, such as a coupler, connector or plug. According to an illustrative embodiment, the ground rod driver 101 includes a body 102 having a first end with an opening 106 and internal female threads 104 and a second end having an opening 108. The body 102 may be a solid structure, a tubular structure or a structure that is at least partially solid and partially tubular. One of the openings on the first end of body 102 (e.g., first opening 106) may be utilized to attach ground rod driver 101 to the ground rod 10 which has been or can be driven into the ground 12 providing an electrical path to earth ground. The ground rod 10 includes a threaded male end 14 to which ground rod driver 101 can be attached using internal female threads 104. The threaded male end 14 may be a threaded stud extending from an end of the ground rod 10, as shown in FIG. 1, or the threaded male end 14 may be integrally formed into the end of the ground rod 10, as shown in FIG. 2. The second opening 108 on the second end of body 102 of ground rod driver 101, depending on the application, may be left open, may be capped with a threaded bolt 110 or may have an additional ground rod extension (not shown) attached thereto.

The cable extension 112 is connected to a side of body 102. For example, according to an illustrative embodiment of the present disclosure, cable extension 112 is connected to body 102 using an exothermic reaction welding process providing a permanent molecular bond 114 between the body 102 and the cable extension 112. Although shown as being mounted perpendicular to body 102, it will be appreciated that cable extension 112 may be mounted to body 102 at any angle suitable for a particular application. The distal end 118 of cable extension 112 may be left as is or may have a connector 116 suitable for a particular application attached thereto. The connector 116 may be attached to the distal end 118 of the cable extension 112 by at least one of crimping, clamping and exothermic reaction welding. Non-limiting examples of the types of connectors 116 that may be attached to the distal end 118 include terminal lugs, connectors for connection to an electrical panel for providing a ground connection, connectors (e.g., clamps) for connection to a pipe such as, for example, a water main and connectors for connection to a steel structure such as, for example, a metal building frame, etc. According to another non-limiting example, connector 116 may be suitable for attachment to a lightning air terminal rod, also known as a lightning rod, (not shown) for providing lightning protection capabilities by discharging and deploying any induced voltage and current surge directly to the ground/earth without harming, for example, power distribution equipment. Alternatively, the lightning rod may have a male threaded end that can be attached directly to opening 108 of the ground rod driver 101.

Figure 3:
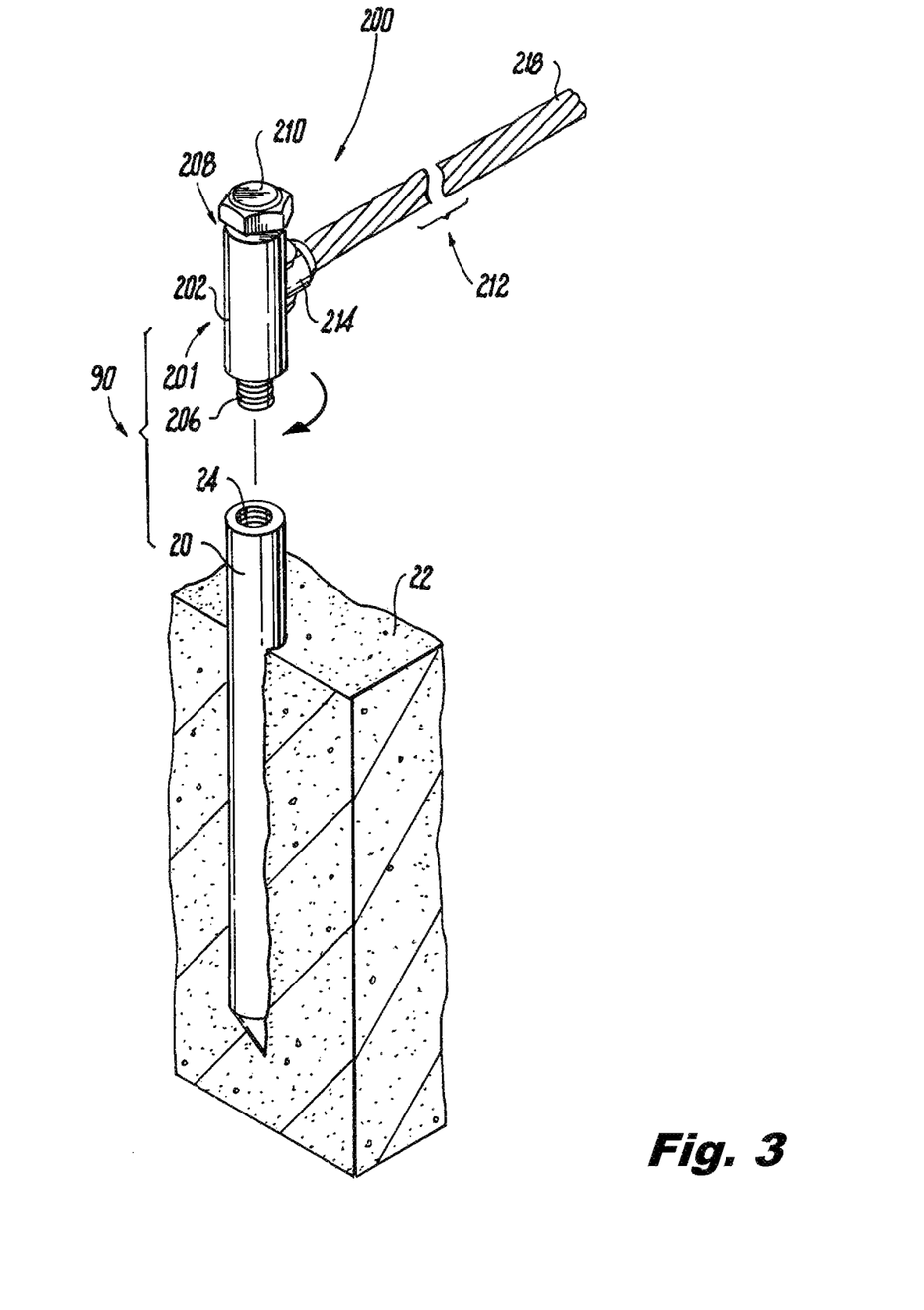
FIG. 3 depicts a perspective view of a grounding system according to another illustrative embodiment of the present disclosure, illustrating a threaded type electrical connection device and a ground rod.

A grounding system (or kit) according to another illustrative embodiment of the present disclosure is shown in FIG. 3. The grounding system 90 includes at least one grounding rod 20 and at least one electrical connection device 200. The electrical connection device 200 includes a ground rod driver 201 and a cable extension 212. As noted, the ground rod driver 201 may come in a number of forms, such as a coupler, connector or plug. According to an illustrative embodiment, the ground rod driver 201 includes a body 202 having a first threaded male end 206 that may be a threaded stud extending from the body 202 or the threaded male end 206 may be integrally formed into the end of the body 202. The body 202 may be a solid structure, a tubular structure or a structure that is at least partially solid and partially tubular. Threaded male end 206 may be utilized to attach ground rod driver 201 to a ground rod 20 which has been or can be driven into the ground 22 providing an electrical path to earth ground. The ground rod 20 includes a threaded female end 24 to which ground rod driver 201 can be attached using threaded male end 206. The body 202 includes a second end having a threaded female opening 208 similar to that described above with respect to FIG. 1. The second end 208 on the second end of body 202 of ground rod driver 201, depending on the application, may be left open, may be capped with a threaded bolt 210 or may have an additional ground rod extension (not shown) attached thereto.

Figure 4:
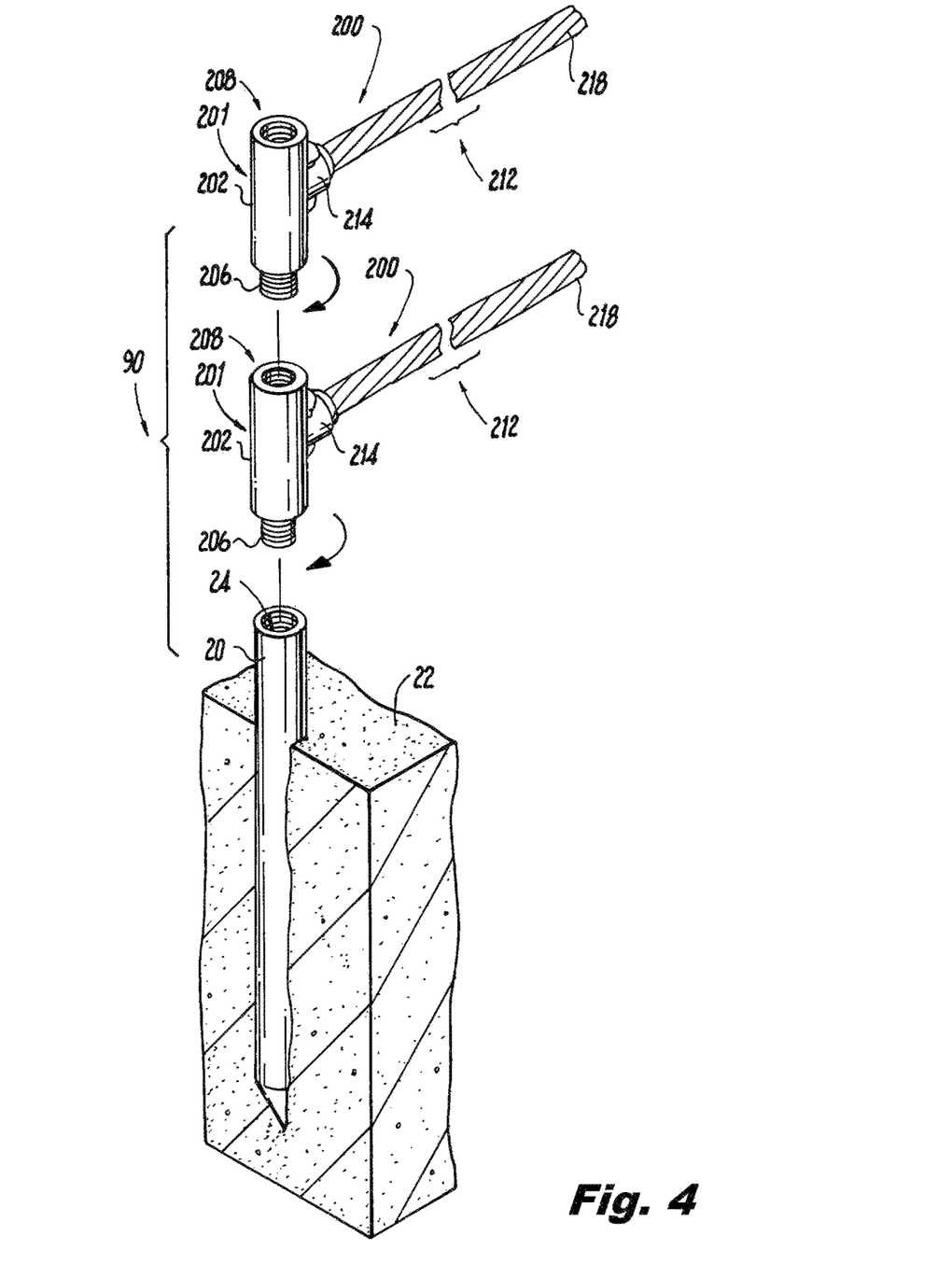
FIG. 4 depicts a perspective view of a grounding system according to another illustrative embodiment of the present disclosure, illustrating plurality of stacked threaded type electrical connection devices and a ground rod.

The cable extension 212 is connected to a side of body 202. For example, according to an illustrative embodiment of the present disclosure, cable extension 212 is connected to body 202 using an exothermic reaction welding process providing a permanent molecular bond 214 between the body 202 and the cable extension 212. Although shown as being mounted perpendicular to body 202, it will be appreciated that cable extension 212 may be mounted to body 202 at any angle suitable for a particular application. Similar to that described above with respect to FIG. 1, the distal end 218 of cable extension 212 may be left as is or may have a connector suitable for a particular application attached thereto. The connector may be attached to the distal end 218 of the cable extension by at least one of crimping, clamping and exothermic reaction welding. Non-limiting examples of the types of connectors that may be attached to the distal end 218 include terminal lugs, connectors for connection to an electrical panel for providing a ground connection, connectors (e.g., clamps) for connection to a pipe such as, for example, a water main and connectors for connection to a steel structure such as, for example, a metal building frame, etc. According to another non-limiting example, the connector may be suitable for attachment to a lightning air terminal rod also known as a lightning rod (not shown) for providing lightning arresting capabilities. Alternatively, the lightning rod may have a male threaded end that can be attached directly to end 208 of ground rod driver 201. According to another illustrative embodiment of the present disclosure as shown in FIG. 4, multiple electrical connection devices 200 may be connected end to end to provide multiple cable extensions 212 for connecting multiple devices, machines or structures to earth ground 22. One or more of the multiple cable extensions 212 may have no connectors and/or may have one or more of the various types of connectors described above.

Figure 5:
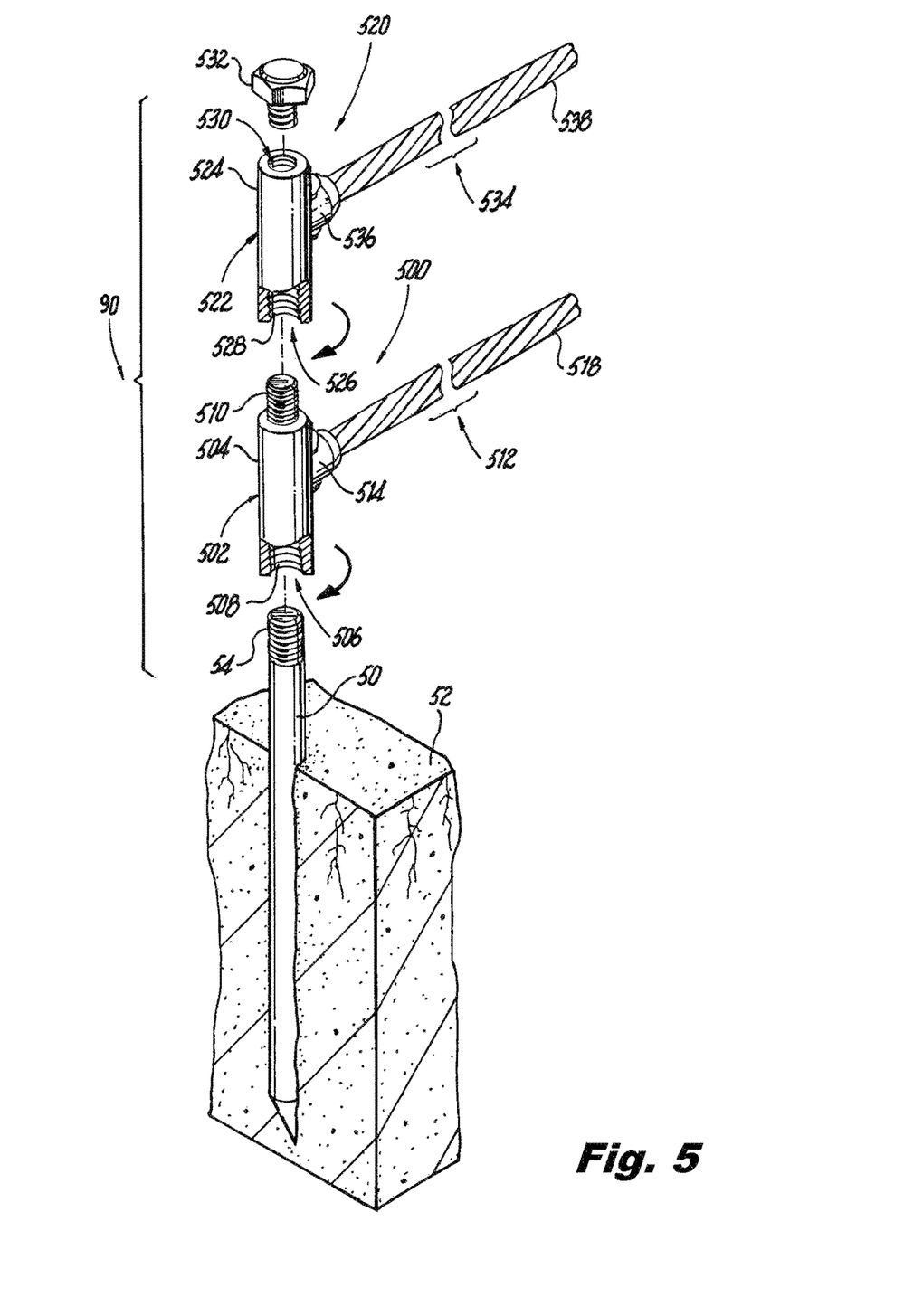
FIG. 5 depicts a perspective view of a grounding system according to another illustrative embodiment of the present disclosure, illustrating a plurality of stacked threaded type electrical connection devices and a ground rod.

A grounding system (or kit) according to another illustrative embodiment of the present disclosure is shown in FIG. 5. The grounding system 90 includes at least one grounding rod 50 and multiple electrical connection devices 500 and 520. The first electrical connection device 500 includes a ground rod driver 502 and a cable extension 512. As noted, the ground rod driver 502 may come in a number of forms, such as a coupler, connector or plug. According to an illustrative embodiment, the ground rod driver 502 includes a body 504. The body 504 may be a solid structure, a tubular structure or a structure that is at least partially solid and partially tubular. The body 504 has a first end with an opening 506, which has internal female threads 508, and a second threaded male end 510. The opening 506 may be utilized to attach ground rod driver 502 to the ground rod 50 which has been or can be driven into the ground 52 providing an electrical path to earth ground. The second male end 510 may be a threaded stud extending from the body 504 or the second male end 510 may be threads integrally formed into the end of the body 504. The grounding rod 50 includes a threaded male end 54 to which ground rod driver 502 can be attached using internal female threads 508. The threaded male end 54 may be integrally formed into the end of the grounding rod 50, as shown in FIG. 5, or the threaded male end 54 may be a threaded stud extending from an end of the ground rod 50 similar to the embodiment shown in FIG. 1.

The cable extension 512 for the electrical connection device 500 is connected to a side of body 504. For example, according to an illustrative embodiment of the present disclosure, cable extension 512 is connected to body 504 using an exothermic reaction welding process providing a permanent molecular bond 514 between the body 504 and the cable extension 512. Although shown as being mounted perpendicular to body 504, it will be appreciated that cable extension 512 may be mounted to body 504 at any angle suitable for a particular application. The distal end 518 of cable extension 512 may be left as is or may have a connector suitable for a particular application attached thereto. The connector may be attached to the distal end 518 of the cable extension 512 by at least one of crimping, clamping and exothermic reaction welding. Non-limiting examples of the types of connectors that may be attached to the distal end 518 include terminal lugs, connectors for connection to an electrical panel for providing a ground connection, connectors (e.g., clamps) for connection to a pipe such as, for example, a water main and connectors for connection to a steel structure such as, for example, a metal building frame, etc. According to another non-limiting example, connector may be suitable for attachment to a lightning air terminal rod, also known as a lightning rod, (not shown) for providing lightning protection capabilities by discharging and deploying any induced voltage and current surge directly to the ground/earth without harming, for example, power distribution equipment.

The second electrical connection device 520 includes a ground rod driver 522 and a cable extension 534. As noted, the ground rod driver 522 may come in a number of forms, such as a coupler, connector or plug. According to an illustrative embodiment, the ground rod driver 522 includes a body 524 having a first end with an opening 526 and internal female threads 528, and a second threaded female end 530. The first electrical connection device 500 can be attached to the second electrical connection device 520 via the second male end 510 and the first end opening 526. The second threaded female end 530 of the ground rod driver 522, depending on the application, may be left open, may be capped with a threaded bolt 532 or may have an additional ground rod extension (not shown) attached thereto.

The cable extension 534 for the electrical connection device 520 is connected to a side of body 524. For example, according to an illustrative embodiment of the present disclosure, cable extension 534 is connected to body 524 using an exothermic reaction welding process providing a permanent molecular bond 536 between the body 524 and the cable extension 534. Although shown as being mounted perpendicular to body 524, it will be appreciated that cable extension 534 may be mounted to body 524 at any angle suitable for a particular application. The distal end 538 of cable extension 534 may be left as is or may have a connector suitable for a particular application attached thereto. The connector may be attached to the distal end 538 of the cable extension 534 by at least one of crimping, clamping and exothermic reaction welding. Non-limiting examples of the types of connectors that may be attached to the distal end 538 include terminal lugs, connectors for connection to an electrical panel for providing a ground connection, connectors (e.g., clamps) for connection to a pipe such as, for example, a water main and connectors for connection to a steel structure such as, for example, a metal building frame, etc. According to another non-limiting example, connector may be suitable for attachment to a lightning air terminal rod, also known as a lightning rod, (not shown) for providing lightning protection capabilities by discharging and deploying any induced voltage and current surge directly to the ground/earth without harming, for example, power distribution equipment. Alternatively, the lightning rod may have a male threaded end that can be attached directly to opening 530 of the ground rod driver 522.

Figure 6:
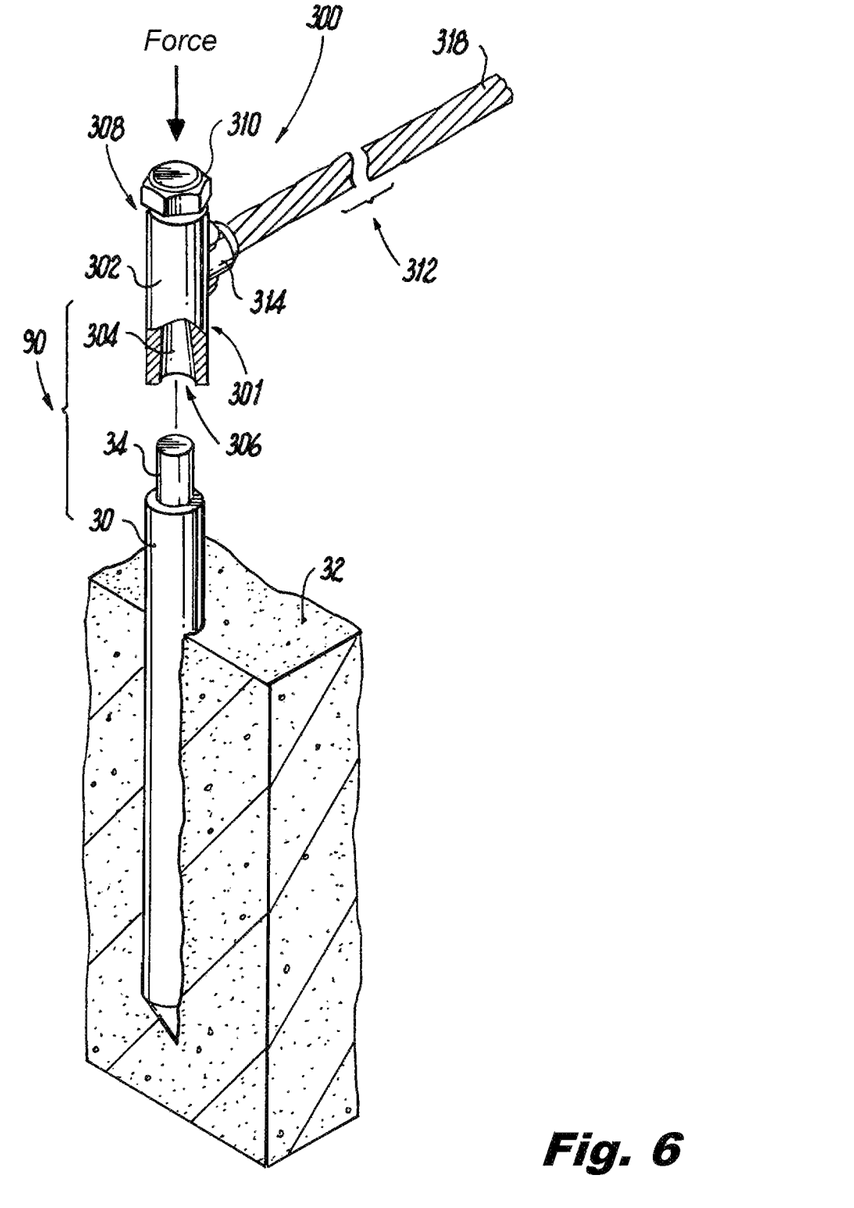
FIG. 6 depicts a perspective view of a grounding system ground rod driver according to another illustrative embodiment of the present disclosure, illustrating a press-fit type electrical connection device and a ground rod.

A grounding system (or kit) according to another illustrative embodiment of the present disclosure is shown in FIG. 6. The grounding system 90 includes at least one grounding rod 30 and at least one electrical connection device 300. The electrical connection device 300 includes a ground rod driver 301 and a cable extension 312. As noted, the ground rod driver may come in a number of forms, such as a coupler, connector or plug. According to an illustrative embodiment, the ground rod driver 301 includes a body 302 having a first end with an opening 306 and a second end having an opening 308. The body 302 may be a solid structure, a tubular structure or a structure that is at least partially solid and partially tubular. Opening 306 leads to an internal female tapered space 304. Opening 306 may be utilized to attach ground rod driver 301 to the grounding rod 30 which has been or can be driven into the ground 32 providing an electrical path to earth ground. Grounding rod 30 includes a male end 34 that may be a stud extending from an end of the grounding rod 30 or the male end 34 may simply be an end of the grounding rod 30. The male end 34 of the grounding rod 30 can be press fit to the ground rod driver 301 via female tapered space 304 in opening 306. The opening 308 of ground rod driver 301 may lead to an internal tapered space similar to space 304. Alternatively, opening 308 may lead to a female threaded opening similar to the embodiments described above with respect to FIG. 1. Depending on the application, opening 308 may be left open, may be capped with a threaded bolt 310, may be capped with a press fit stud, or may have an additional ground rod extension (not shown) attached thereto. The bolt 310 or stud may be a hardened steel driving cap used for tapping and driving the ground rod driver 301 onto grounding rod 30 and possibly for driving the grounding rod 30 into the earth.

The cable extension 312 is connected to a side of body 302. For example, according to an illustrative embodiment of the present disclosure, cable extension 312 is connected to body 302 using an exothermic reaction welding process providing a permanent molecular bond 314 between the body 302 and the cable extension 312. Although shown as being mounted perpendicular to the body 302, it will be appreciated that cable extension 312 may be mounted to the body 302 at any angle suitable for a particular application. The free end or distal end 318 of the cable extension 312 may be left as is or may have a connector (not shown) suitable for a particular application attached thereto. The connector may be attached to the distal end 318 of the cable extension 312 by at least one of crimping, clamping and exothermic reaction welding. Non-limiting examples of the types of connectors that may be attached to the distal end 318 include terminal lugs, connectors for connection to an electrical panel for providing a ground connection, connectors (e.g., clamps) for connection to a pipe such as, for example, a water main and connectors for connection to a steel structure such as, for example, a metal building frame, etc. According to another non-limiting example, the connector may be suitable for attachment to a lightning air terminal rod, also known as a lightning rod, (not shown) for providing lightning protection capabilities. Alternatively, the lightning rod may have a male end that can be attached directly to end 308 of ground rod driver 300.

Figure 7:
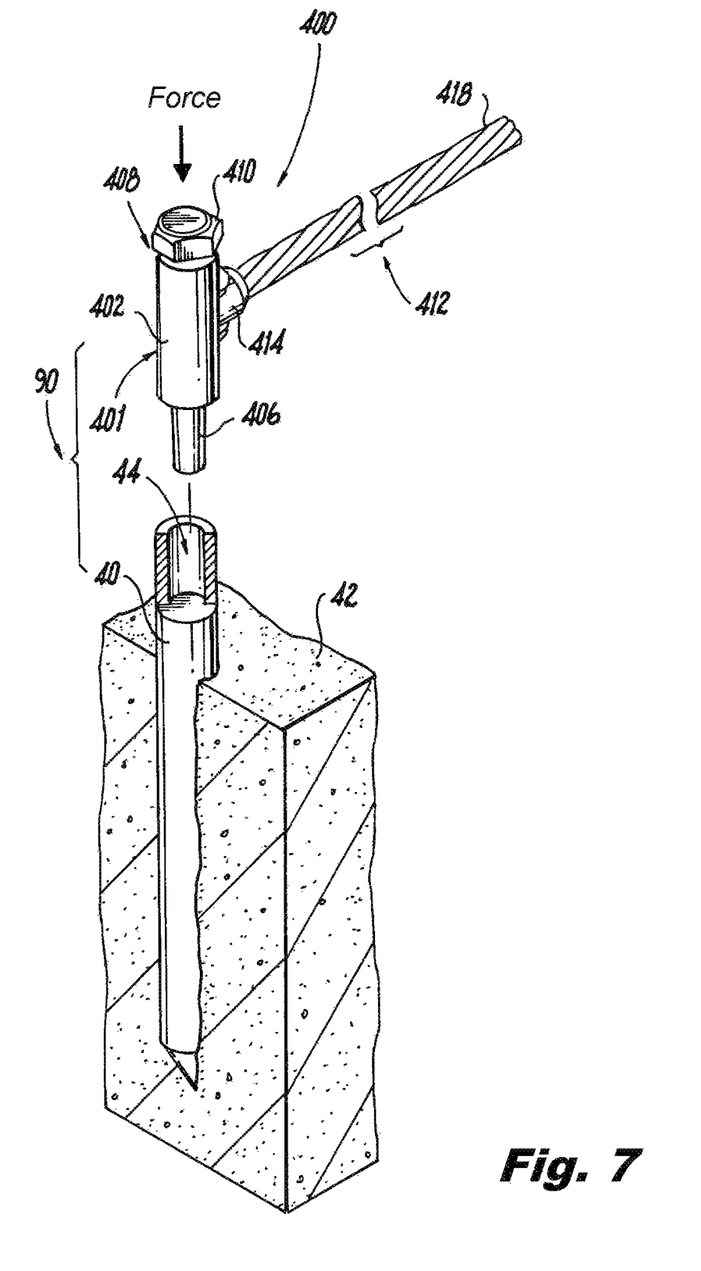
FIG. 7 depicts a perspective view of a grounding system according to another illustrative embodiment of the present disclosure, illustrating a press-fit type electrical connection device and a ground rod.

A grounding system (or kit) according to another illustrative embodiment of the present disclosure is shown in FIG. 7. The grounding system 90 includes at least one grounding rod 40 and at least one electrical connection device 400. The electrical connection device 400 includes a ground rod driver 401 and a cable extension 412. As noted, the ground rod driver 401 may come in a number of forms, such as a coupler, connector or plug. According to an illustrative embodiment, the ground rod driver 401 includes a body 402 having a tapered male end 406. The tapered male end 406 may be a stud extending from the body 402 or the tapered male end 406 may be integrally formed into the body 402. The body 402 may be a solid structure, a tubular structure or a structure that is at least partially solid and partially tubular. Tapered male end 406 may be utilized to attach ground rod driver 401 to a grounding rod 40 which has been or can be driven into the ground 42 providing an electrical path to ground. For example, grounding rod 40 includes a female end 44 to which ground rod driver 401 can be attached using tapered male end 406.

The body 402 also includes a second end having a threaded female opening 408 similar to that described above with respect to FIG. 1. Alternatively, the second end may include a tapered female opening similar to that described above with respect to FIG. 3. The second end 408 of ground rod driver 401, depending on the application, may be left open, may be capped with a bolt 410, may be capped with a stud, or may have an additional ground rod extension (not shown) attached thereto. If the female opening 408 is threaded, then the bolt 410 is used to cap the female opening. If the female opening 408 is a tapered opening, then a stud may be press fit to body 402. The bolt 410 or stud may be a hardened steel driving cap used for tapping and driving the ground rod driver 401 onto grounding rod 40 and possibly for driving the grounding rod 40 into the earth ground 42.

Figure 8:
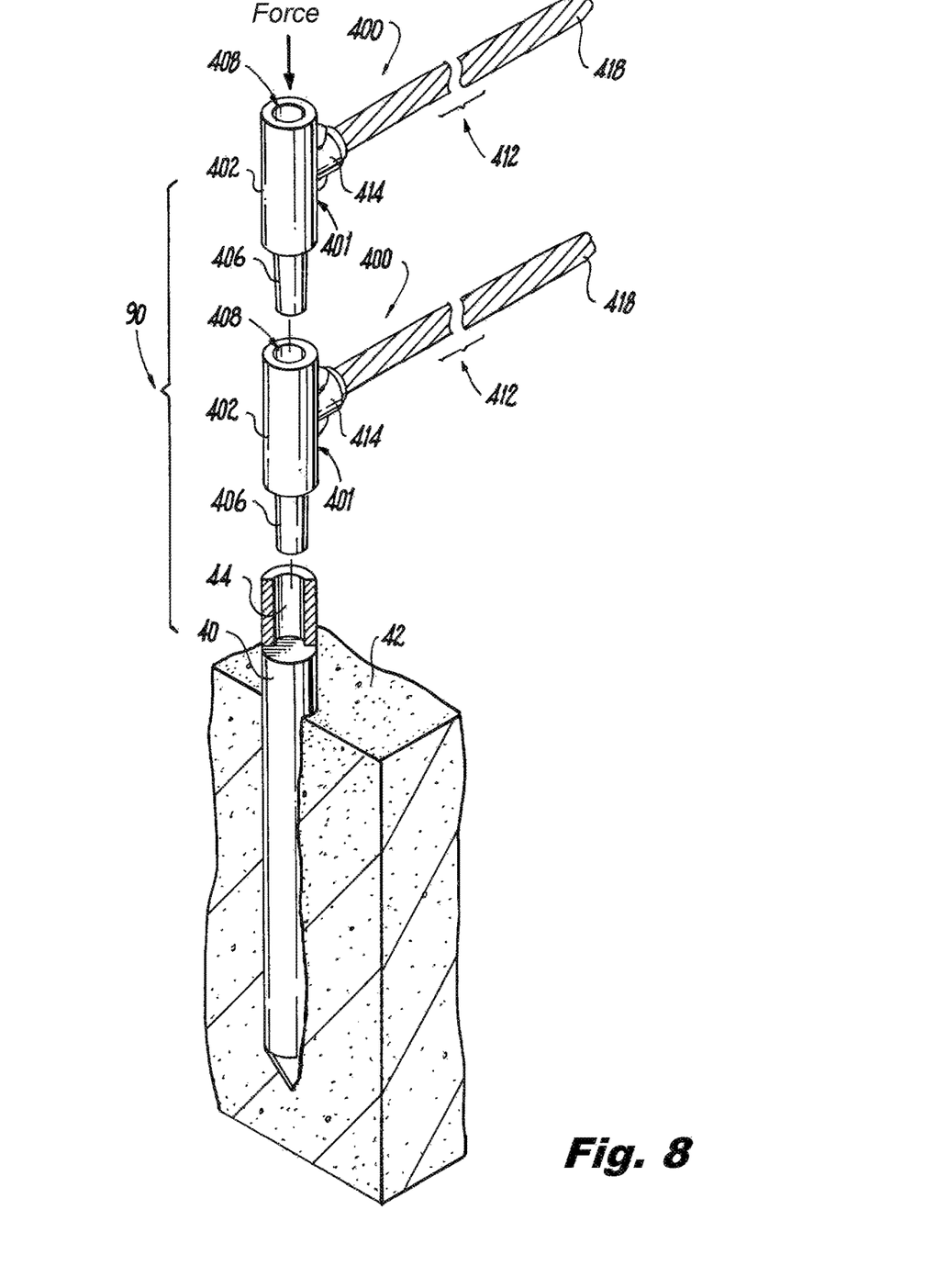
FIG. 8 depicts a perspective view of a grounding system according to another illustrative embodiment of the present disclosure, illustrating a plurality of stacked press-fit type electrical connection devices and a ground rod.

The cable extension 412 is connected to a side of body 402. For example, according to an illustrative embodiment of the present disclosure, cable extension 412 is connected to body 402 using an exothermic reaction welding process providing a permanent molecular bond 414 between the body 402 and the cable extension 412. Although shown as being mounted perpendicular to body 402, it will be appreciated that cable extension 412 may be mounted to body 402 at any angle suitable for a particular application. As described above with respect to the other embodiments, the distal end 418 of cable extension 412 may be left as is or may have a connector suitable for a particular application attached thereto. The connector may be attached to the distal end 418 of the cable extension by at least one of crimping, clamping and exothermic reaction welding. Non-limiting examples of the types of connectors that may be attached to the distal end 418 include terminal lugs, connectors for connection to an electrical panel for providing a ground connection, connectors (e.g., clamps) for connection to a pipe such as, for example, a water main and connectors for connection to a steel structure such as, for example, a metal building frame, etc. According to another non-limiting example, the connector may be suitable for attachment to a lightning air terminal rod, also known as a lightning rod, (not shown) for providing lightning protection capabilities. Alternatively, the lightning rod may have a male end that can be attached directly to end 408 of ground rod driver 401. According to another illustrative embodiment of the present disclosure as shown in FIG. 8, multiple electrical connection devices 400 may be connected end to end to provide multiple cable extensions 412 for connecting multiple devices, machines or structures to earth ground 42. One or more of the multiple cable extensions may have no connectors and/or may have one or more of the various types of connectors described above.

Figure 9:
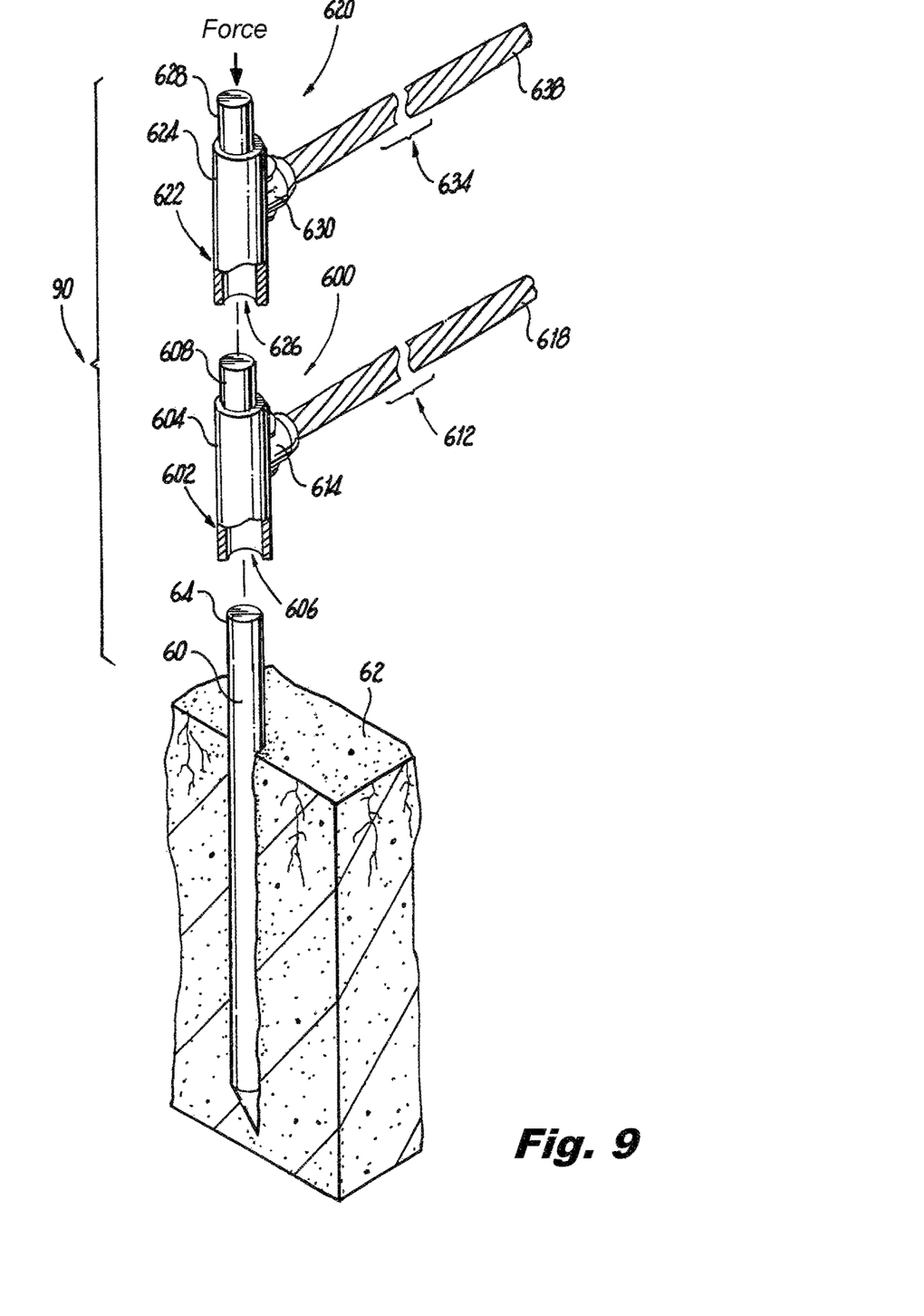
FIG. 9 depicts a perspective view of a grounding system according to another illustrative embodiment of the present disclosure, illustrating a plurality of stacked press-fit type electrical connection devices and a ground rod.

A grounding system (or kit) according to another illustrative embodiment of the present disclosure is shown in FIG. 9. The grounding system 90 includes at least one grounding rod 60 and multiple electrical connection devices 600 and 620. The first electrical connection device 600 includes a ground rod driver 602 and a cable extension 612. As noted, the ground rod driver 602 may come in a number of forms, such as a coupler, connector or plug. According to an illustrative embodiment, the ground rod driver 602 includes a body 604 having a female end with an opening 606 and a male end 608. The body 604 may be a solid structure, a tubular structure or a structure that is at least partially solid and partially tubular. The opening 606 of the female end of the body 604 may be utilized to attach ground rod driver 602 to the grounding rod 60 which has been or can be driven into the ground 62 providing an electrical path to ground 62. For example, grounding rod 60 includes a male end 64 to which ground rod driver 602 can be attached using the opening 606 in the female end of the body 604 via a press fit or friction fit. The male end 608 may be a stud extending from the body 604 or the male end 608 may be integrally formed into the body 604. The male end 608 is used to mate with the second electrical connection device 620.

The cable extension 612 of the electrical connection device 600 is connected to a side of body 604. For example, according to an illustrative embodiment of the present disclosure, cable extension 612 is connected to body 604 using an exothermic reaction welding process providing a permanent molecular bond 614 between the body 604 and the cable extension 612. Although shown as being mounted perpendicular to body 604, it will be appreciated that cable extension 612 may be mounted to body 604 at any angle suitable for a particular application. As described above with respect to the other embodiments, the distal end 618 of cable extension 612 may be left as is or may have a connector suitable for a particular application attached thereto. The connector may be attached to the distal end 618 of the cable extension by at least one of crimping, clamping and exothermic reaction welding. Non-limiting examples of the types of connectors that may be attached to the distal end 618 include terminal lugs, connectors for connection to an electrical panel for providing a ground connection, connectors (e.g., clamps) for connection to a pipe such as, for example, a water main and connectors for connection to a steel structure such as, for example, a metal building frame, etc. According to another non-limiting example, the connector may be suitable for attachment to a lightning air terminal rod, also known as a lightning rod, (not shown) for providing lightning protection capabilities.

The second electrical connection device 620 includes a ground rod driver 622 and a cable extension 634. As noted, the ground rod driver 622 may come in a number of forms, such as a coupler, connector or plug. According to an illustrative embodiment, the ground rod driver 622 includes a body 624 having a female end with an opening 626 and a male end 628. The body 624 may be a solid structure, a tubular structure or a structure that is at least partially solid and partially tubular. The female end 626 may be utilized to attach ground rod driver 622 to the ground rod driver 602 for providing an electrical path to earth ground 62 via ground rod driver 602 and the ground rod 60. For example, the male end 608 of ground rod driver 602 can be attached to the female end 626 of the ground rod driver 622 via a press fit or friction fit. The male end 628 may be a stud extending from the body 624 or the male end 628 may be integrally formed into the body 624. The male end 628 can be used to mate with another electrical connection device (not shown), a ground rod extension (not shown) or as a stud to drive the ground rod into the earth.

The cable extension 634 for the electrical connection device 620 is connected to a side of body 624. For example, according to an illustrative embodiment of the present disclosure, cable extension 634 is connected to body 624 using an exothermic reaction welding process providing a permanent molecular bond 630 between the body 624 and the cable extension 634. Although shown as being mounted perpendicular to body 624, it will be appreciated that cable extension 634 may be mounted to body 624 at any angle suitable for a particular application. The distal end 638 of cable extension 634 may be left as is or may have a connector suitable for a particular application attached thereto. The connector may be attached to the distal end 638 of the cable extension 634 by at least one of crimping, clamping and exothermic reaction welding. Non-limiting examples of the types of connectors that may be attached to the distal end 638 include terminal lugs, connectors for connection to an electrical panel for providing a ground connection, connectors (e.g., clamps) for connection to a pipe such as, for example, a water main and connectors for connection to a steel structure such as, for example, a metal building frame, etc. According to another non-limiting example, connector may be suitable for attachment to a lightning air terminal rod, also known as a lightning rod, (not shown) for providing lightning protection capabilities by discharging and deploying any induced voltage and current surge directly to the ground/earth without harming, for example, power distribution equipment. Alternatively, the lightning rod may have a female end that can be attached directly to the male end 628 of the ground rod driver 622 via a press or friction fit.

Figure 10:
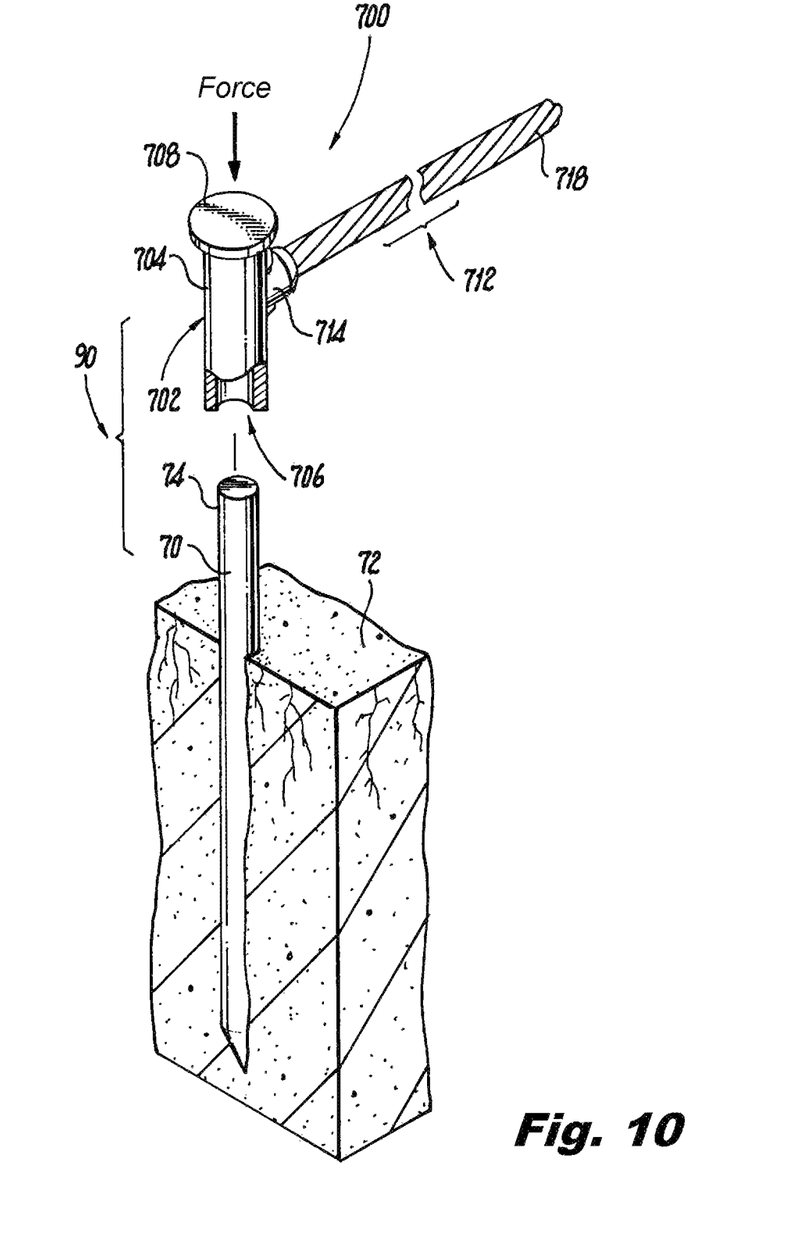
FIG. 10 depicts a perspective view of a grounding system according to another illustrative embodiment of the present disclosure, illustrating a press-fit plug type electrical connection device and a ground rod.

A grounding system (or kit) according to another illustrative embodiment of the present disclosure is shown in FIG. 10. The grounding system 90 includes at least one grounding rod 70 and at least one electrical connection device 700. The electrical connection device 700 is a plug type electrical connection device that includes a ground rod driver 702 in the form of a plug and a cable extension 712. According to an illustrative embodiment, the ground rod driver 702 includes a body 704 having a female end with an opening 706 and a capped end 708. The body 704 may be a solid structure, a tubular structure or a structure that is at least partially solid and partially tubular. The opening 706 in the female end may be utilized to attach ground rod driver 702 to the grounding rod 70 which has been or can be driven into the ground 72 providing an electrical path to ground. For example, grounding rod 70 includes a male end 74 to which ground rod driver 702 can be attached using the opening 706 in the female end of ground driver 702 via a press fit or friction fit. The capped end 708 may be a cap secured to the body 704 via, for example, a weld or the capped end 708 may be integrally formed into the body 704. The capped end 708 can be used to drive the grounding rod 70 into the earth ground 72.

The cable extension 712 is connected to a side of body 704. For example, according to an illustrative embodiment of the present disclosure, cable extension 712 is connected to body 704 using an exothermic reaction welding process providing a permanent molecular bond 714 between the body 704 and the cable extension 712. Although shown as being mounted perpendicular to body 704, it will be appreciated that cable extension 712 may be mounted to body 704 at any angle suitable for a particular application. As described above with respect to the other embodiments, the distal end 718 of cable extension 712 may be left as is or may have a connector suitable for a particular application attached thereto. The connector may be attached to the distal end 718 of the cable extension by at least one of crimping, clamping and exothermic reaction welding. Non-limiting examples of the types of connectors that may be attached to the distal end 718 include terminal lugs, connectors for connection to an electrical panel for providing a ground connection, connectors (e.g., clamps) for connection to a pipe such as, for example, a water main and connectors for connection to a steel structure such as, for example, a metal building frame, etc. According to another non-limiting example, the connector may be suitable for attachment to a lightning air terminal rod also known as a lightning rod (not shown) for providing lightning protection capabilities.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical connection device comprising:
    a ground rod driver having a body with a first end and a second end opposite the first end, the first end of the body including a first attachment member coaxially aligned with a long axis of the body and configured to be connected to a ground rod or another ground rod driver and the second end of the body including a second attachment member coaxially aligned with the long axis of the body and configured to be connected to a ground rod or another ground rod driver; and
    a conductor cable having one end exothermically welded directly to the body of the ground rod driver at a point between the first end and the second end, and a free end.

2. The electrical connection device as recited in claim 1, wherein the first attachment member comprises a female member for attachment to the ground rod.

3. The electrical connection device as recited in claim 2, wherein the female member comprises a threaded receptacle.

4. The electrical connection device as recited in claim 2, wherein the female member comprises a tapered receptacle.

5. The electrical connection device as recited in claim 1, wherein the first attachment member comprises a male member for attachment to the ground rod.

6. The electrical connection device as recited in claim 5, wherein the male member comprises a threaded extension.

7. The electrical connection device as recited in claim 1, wherein the ground rod driver comprises at least one of copper, brass and stainless steel.

8. The electrical connection device as recited in claim 1, wherein the conductor cable comprises at least one of copper, aluminum, steel, stainless steel and brass.

9. The electrical connection device as recited in claim 1, wherein the conductor cable comprises at least one of stranded and solid cable.

10. The electrical connection device as recited in claim 1, further comprising a connector connected to the free end of the conductor cable.

11. The electrical connection device as recited in claim 10, wherein the connector is a terminal lug.

12. An electrical grounding kit comprising:
    a grounding rod;
    a ground rod driver having a body with a first end and a second end opposite the first end, the first end of the body including a first attachment member coaxially aligned with a long axis of the body and configured to be connected to a ground rod or another ground rod driver and the second end of the body including a second attachment member coaxially aligned with the long axis of the body and configured to be connected to a ground rod or another ground rod driver; and
    a conductor cable having one end exothermically welded directly to the body of the ground rod driver at a point between the first end and the second end, and a free end.

13. The electrical connection device as recited in claim 5, wherein the male member comprises a threaded extension.

14. The electrical connection device as recited in claim 1, wherein the second attachment member comprises a second female member.

15. The electrical connection device as recited in claim 14, wherein the second female member comprises a threaded female receptacle.

16. The electrical connection device as recited in claim 14, wherein the second female member comprises a tapered female receptacle.

17. The electrical connection device as recited in claim 1, wherein the second attachment member comprises a second male member.

18. The electrical connection device as recited in claim 17, wherein the second male member comprises a threaded male extension.

19. The electrical connection device as recited in claim 17, wherein the second male member comprises a tapered male extension.

20. The electrical connection device as recited in claim 1, further comprising a second ground rod driver connected to the free end of the conductor cable.

* * * * *